United States Patent

Scalan

[15] 3,649,201

[45] Mar. 14, 1972

[54] RESERVOIR ANALYSIS

[72] Inventor: Richard S. Scalan, Bartlesville, Okla.

[73] Assignee: Phillips Petroleum Company

[22] Filed: Oct. 27, 1967

[21] Appl. No.: 678,643

[52] U.S. Cl. ..................................................23/230 EP
[51] Int. Cl. ......................................................G01n 33/24
[58] Field of Search...................................23/230 EP, 230

[56] References Cited

OTHER PUBLICATIONS

Silverman et al., Bull. Amer. Assocn. of Petroleum Geologists, 42, No. 5 (May 1958) pp. 998–1012
Craig, H., Geochim. et Cosmochim. Acts 3, 53–92 (1953) Pages 53, 57, 60, 67, 68, 70, 76 to 79 relied on.

*Primary Examiner*—Morris O. Wolk
*Assistant Examiner*—R. M. Reese
*Attorney*—Young and Quigg

[57] ABSTRACT

The inneity of mobile organic reservoir fluids, i.e., their origin or lack of origin in the particular source rocks associated with a reservoir formation, is determined by isolating these mobile organics from relatively immobile organics and inorganic carbonaceous matter and determining the relative concentrations of carbon–12 and carbon–13 isotopes therein, isolating the relatively immobile indigenous organic matter from the relatively mobile organics and inorganic carbonaceous matter and evaluating the relative magnitudes; i.e., concentrations, of the carbon–13 and carbon–12 isotopes of this material and establishing the correspondence or lack of correspondence between the ratios, differences or other relevant comparisons of the carbon–13 and carbon–12 isotopes of each respective material. Correspondence between these values for the mobile and immobile organic materials illustrates a high degree of probability that the relatively mobile organic matter has the same origin as the indigenous organic material and, therefore, is itself indigenous to the parent formation.

3 Claims, 1 Drawing Figure

PATENTED MAR 14 1972  3,649,201
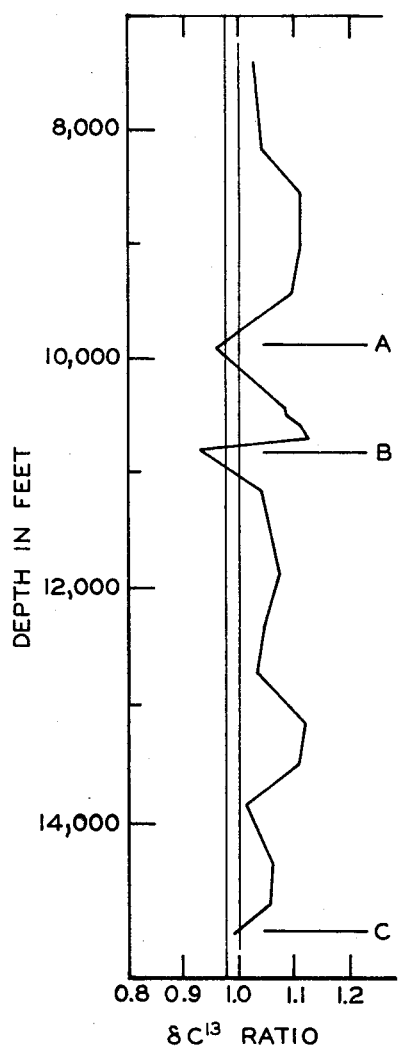
INVENTOR.
R.S. SCALAN
BY Young and Quigg
ATTORNEYS

RESERVOIR ANALYSIS

BACKGROUND OF THE INVENTION

There are various methods of testing rocks whereby their value as possible source-rocks of petroleum is estimated. One such test is to measure the Carbon-Preference-Index (hereinafter called CPI) of the soluble organic matter contained in the prospect rock. This test is described by Bray and Evans, Geochim. et Cosmochim. Acta 22, 2 (1961) CPI is defined as an unbiased ratio of the amount of n-paraffins having an odd number of carbons in the chain length to those having an even number of carbons and is given by the expression $$CPI = \frac{C_{25} + 2(C_{27} + C_{29} + C_{31} + C_{33}) + C_{35}}{2(C_{26} + C_{28} + C_{30} + C_{32} + C_{34})}$$

where $C_{(i)}$ is the weight percent of n-paraffins having (i) carbon atoms in its chain length.

Where CPI has a value between 1.0 and 1.2 the organic matter in the rock is considered to have undergone the petroleum genesis process and the rock may have served as a source of petroleum. Where CPI has a value greater than 1.2, i.e., where odd paraffins outweigh even paraffins by more than 20 percent, the petroleum genesis step is not believed to have taken place and the rock is not a likely source-rock of petroleum.

In the CPI test outlined above, it is important to realize that the test is valid only if the paraffins are indigenous to the rock. If they are not indigenous but have migrated into the rock, then the test is invalid.

Another means of testing the quality of a possible source-rock of petroleum is described by Philippi, paper presented at XXth Int'., Geol. Cong., Mexico City (1956), "Identification of Oil Source Beds by Chemical Means." By this method, the amount of soluble, oillike material is quantitatively measured. The source-rock quality varies from "Excellent"—>5,000 p.p.m. hydrocarbon to "Very Poor"—0 to 50 p.p.m. hydrocarbon with qualities, "Very Good"—1,500 to 5,000 p.p.m., "Good"—500 to 1,500 p.p.m., "Fair"—150 to 500 p.p.m., and "Poor"—50 to 150 p.p.m. intervening.

Philippi recognized that the method was valid only for "indigenous" hydrocarbons and proposed that a suite of samples be quantitatively analyzed for both soluble and insoluble organic matter. Where the two quantities were correlatable in the suite, the oily material was considered indigenous. Where no correlation was observed, the oily material was considered migrated petroleum.

These source-rock studies, and any such studies which depend upon the indigenous nature of the organic extracts, would be made more definitive if the origin of mobile reservoir organics could be accurately determined or at least qualified.

It is therefore one object of this invention to provide an improvement for evaluating formations containing organic materials. It is another object of this invention to provide a method for determining or at least qualifying the origin of relatively mobile organic materials. It is yet another object of this invention to provide a method for determining the identity or origin of relatively mobile and relatively immobile organic materials found in source-rocks associated with reservoir formations.

SUMMARY OF THE INVENTION

The inneity of mobile organic reservoir fluids, i.e., their origin or lack of origin in the particular source-rocks associated with reservoir formation, is determined by isolating these mobile organics from relatively immobile organics and inorganic carbonaceous matter and determining the relative magnitudes of carbon-12 and carbon-13 isotopes, isolating the relatively immobile indigenous organic matter from the relatively mobile organics and inorganic carbonaceous matter and evaluating the relative magnitudes; i.e., concentrations, of the carbon-13 and carbon-12 isotopes of this material and establishing the correspondence or lack of correspondence between the ratios, differences or other relevant comparisons of the carbon-13 and carbon-12 isotopes of each respective material. Correspondence between these values for the mobile and immobile organic matter illustrates a high degree of probability that the relatively mobile organic matter has the same origin as the indigenous organic material and, therefore, is itself indigenous to the parent formation.

DETAILED DESCRIPTION

Comparison of the $C_{13}/C_{12}$ ratios or differences between carbon-13:carbon-12 concentrations in the indigenous immobile kerogenlike organics and the mobile organic materials as well as other modes of expression can be employed to illustrate the correspondence or lack of correspondence between the relative concentrations of carbon-13 and carbon-12 in the mobile organic fluids and immobile kerogenlike organics. However, due to the fact that carbon-13 concentrations are generally very small as compared to the concentrations of carbon-12 in either the mobile or immobile organic materials, the most satisfactory mode of expression is usually considered to be the ratio of carbon-13 in the mobile organics to the concentration of carbon-13 in the indigenous organic matter or a comparison of the $C_{13}/C_{12}$ ratios for each respective sample.

Indigenous, petroleumlike organic materials and insoluble kerogenlike organic materials, which must be indigenous to the host rock, have their origin in the organic materials incorporated into the sediments at the time of deposition. Some authorities believe that the petroleumlike, mobile material is derived from the insoluble, residual, immobile material (kerogen). Others believe that both the mobile and immobile organic phases are derived from a "proto" organic material originally deposited in the sediments. In either case, these two phases are genetically related one to the other. Because of this fact, the carbon isotopic compositions of these two vastly different types of organic materials are also genetically related.

Isotopic composition values are commonly expressed as parts per thousand difference in the ($C_{13}/C_{12}$) ratio between the sample under investigation and an arbitrary standard as denoted in equation (1) by the subscripts (samp) and (std), respectively.

$$\delta = \left[ \frac{(C_{13}/C_{12})_{samp}}{(C_{13}/C_{12})_{std}} - 1 \right] \times 1,000 \qquad (1)$$

Where $\delta$ values are positive, the sample is isotopically enriched in carbon of mass 13 with respect to the standard. Where $\delta$ values are negative, the sample is depleted in carbon of mass 13. The arbitrary standard referred to in this invention is well known to those familiar with the state of the art and is commonly called "PDB" as defined in H. Craig, Geochimica et Cosmochimica Acta, Volume 12, pages 133–149 (1957).

In my experiences in the measurements of carbon isotopic compositions, I have found that the petroleumlike, mobile organic material has a more negative $\delta$ value than the kerogenous material with which it is genetically related. If the $\delta$ values for soluble organics be divided by the $\delta$ value for insoluble organics, the ratio so computed is greater than one, usually by 1 to 12 percent; that is, the ratio usually ranges from 1.01 to 1.12. This is consistent with known distributions of isotopic carbon in organisms and sediments. If the ratio of $\delta$ values is less than one, a nonindigenous soluble organic material is indicated. Because of uncertainties in the precision of measurements, ratio values between 0.98 and 1.00 would be in a questionable range; that is, their difference from unity is questionable.

In a specific case where a thick shale section was evaluated for source-rock quality, the isotopic method of this invention was applied. The figure shows a plot of the ratio of $\delta$ values for this thick shale sequence versus the vertical position of the sample in the sequence. Ratio values to the left of the vertical lines in the figure indicate nonindigenous petroleumlike organic materials, values between the lines are of questionable value, and those to the right are indicative of soluble organic materials indigenous to the host rock. Three points A, B, and C are shown in the figure where the usual relationship for genetically related materials does not obtain. For samples at A and B, the usual methods of source-beds evaluation are not valid because the soluble organic materials are not regarded as indigenous to the host rock. Evaluations based on the sample at C would be questionable but not necessarily invalid.

In application of this invention, the carbon isotopic compositions of both insoluble and soluble organic materials contained in shales are determined. If the usual relationships for genetically related organic materials are not observed, the soluble organic material is considered to have migrated into the rock and thus it cannot be used for source-beds evaluation. If the relationships are observed, evaluation may be made with a greater probability of success.

The relative isotope concentrations are determined by analysis of rock samples such as cores, cuttings, outcrops, etc., which are freed of extraneous contamination, e.g., drilling mud, soil, vegetation, etc., by conventional means, such as deionized water-washing and brushing. Extraneous contamination of organic material should be avoided for the reason that these materials also contain isotopes of carbon which would bias subsequent analytical results. The samples are preferably crushed by conventional means such as a steel jaw mill to produce relatively small granules which can then be ground in a disc-grinder and/or mortar and pestle to a size suitable for extraction of the mobile organics and subsequent combustion of the relatively immobile kerogenlike material. Removal of these mobile organics by extraction and combustion can, of course, be accelerated by reducing the sample particle size even further by such means as ball milling.

The relatively mobile organic material contained in these samples is then extracted with a solvent having a high preference for the mobile organics and being substantially nonsolvent for the immobile organic kerogenlike material. Examples of suitable solvents are methylene chloride, benzene, toluene, carbon tetrachloride, or mixtures of these solvents in addition to acetone, methanol, propanol, etc. Exhaustive extraction by such means as Soxhlet extraction apparatus, at or about the boiling point of the solvent is presently preferred. The solvents can, of course, be evaporated from the extract by suitable means such as rotary vacuum evaporators and the like.

Usually only a minor proportion, e.g., about 3 percent of the total organic matter contained in the original sample can be extracted by such procedures. The remainder "insoluble" organic matter, i.e., the relatively immobile organics, remains in the extracted rock sample. In addition, the extracted rock may contain inorganic forms of carbon that are preferably removed prior to analysis of organic carbon isotopic composition of the relatively immobile kerogenlike material. Such inorganic carbonaceous material is usually contained in carbonate minerals such as calcite, dolomite, aragonite, and the like.

The means employed for the removal of this inorganic carbonaceous material should not affect the composition of the residual kerogenlike matter. Numerous methods by which this function can be accomplished are well known in the art, most of which customarily involve dissolving the inorganic carbonaceous matter in an inorganic acid which is, at least under the conditions employed for the removal of the inorganic matter, relatively inert to the residual organics. For example, approximately 2 grams of an extracted rock sample were boiled for 5 minutes in about 10 ml. of HCl diluted 1:1 with water after which the residue was filtered on a porous glass filter. Other filter materials such as silver which are inert to the solvent medium also are employed. This residue was washed with deionized water, acetone, toluene, methanol and again with acetone to remove all traces of the inorganic carbonaceous matter. This sample was then dried in air to remove remaining traces of solvent.

By these procedures, the relatively mobile "soluble" organics and the relatively immobile "insoluble" organics can be separated from each other and from the inorganic carbonaceous material. Following this procedure, the immobile and mobile organic materials are separately analyzed by any suitable method known in the art for the determination of carbon-13 and carbon-12 concentrations and/or ratios. For example, each sample can be combusted separately in an isotope combustion system such as that described by Craig in Geochim. et Cosmochim. Acta 3, 53–92 (1953). By this procedure, the prepared samples are combusted over copper oxide catalyst at about 925° C. for 15 minutes under an oxygen pressure of 15 mm. Hg. Carbon dioxide produced by this combustion is collected and purified by differential freezing to produce a pure carbon dioxide product which can be employed as the working gas in a mass spectrometer by which means the carbon isotopic composition is determined. A mass spectrometric analyzer particularly suitable for this analysis has a 35 centimeter radius, 90° sector analyzer section with 12° of "beta focusing"; a dual ion collector system and dual sample inlet system specifically designed for isotope ratio comparisons, similar to that described by Nier, Rev. Sci. Instr. 18, 398–411 (1947) and by McKinney, McCrea, Epstein, Allen and Vrez, Rev. Sci. Instr. 21, 714–730 (1950).

I claim:

1. A method of establishing a petroleumlike, relatively mobile organic reservoir matter as indigenous to strata containing said relatively mobile organic matter said strata containing also indigenous, inorganic carbonaceous matter and indigenous, kerogenlike, immobile organic matter which method comprises (1) extracting the relatively mobile organic reservoir matter from a sample of said strata with a solvent which is preferential to said relatively mobile organic matter and substantially nonsolvent for said relatively immobile organic matter, obtaining and separating the solvent with extract and the solvent-extracted residual sample; (2) dissolving and separating the thus dissolved inorganic carbonaceous matter from the solvent extracted residual sample of said strata using an aqueous inorganic acid medium in which the relatively immobile organic matter is relatively insoluble; (3) separately determining concentration of carbon-13 and carbon-12 isotopes of said relatively mobile organic reservoir matter extracted from the sample and of said relatively immobile organic matter remaining after extraction and dissolving of the inorganic carbonaceous matter from the sample, these separately determined concentrations being computed as δ values denoted in the equation $$\delta = \left[ \frac{(C_{13}/C_{12})\ \text{Sample}}{(C_{13}/C_{12})\ \text{Standard}} - 1 \right] \times 1,000$$

wherein the standard is "PDB" as defined in H. Craig, Geochimica et Cosmochimica Acta, Volume 12, pages 133–149 (1957); and (4) establishing as a magnitude relationship the ratio of the relative concentration of carbon-13 and carbon-12 isotopes for the said relatively mobile organic matter to the concentration of carbon-13 and carbon-12 isotopes for said relatively immobile organic matter as the ratio of the respective δ values wherein the magnitude relationship within the range of about 1.01 to about 1.12 indicates that said relatively mobile organic matter is indigenous to the strata.

2. The method of claim 1 wherein said inorganic carbonaceous matter comprises carbonate minerals.

3. The method of claim 1 wherein said inorganic acid medium comprises HCl.

* * * * *